United States Patent
Ruiz et al.

(10) Patent No.: US 11,613,689 B2
(45) Date of Patent: Mar. 28, 2023

(54) COMPOSITE CEMENTITIOUS MATERIAL FOR CEMENT COMPOSITIONS

(71) Applicant: Halliburton Energy Services, Inc., Houston, TX (US)

(72) Inventors: Stephanie Ruiz, Spring, TX (US); Thomas Jason Pisklak, Cypress, TX (US); William Cecil Pearl, Jr., Spring, TX (US); Paul Joseph Jones, Houston, TX (US); Samuel Jason Lewis, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 281 days.

(21) Appl. No.: 16/609,419

(22) PCT Filed: Dec. 3, 2018

(86) PCT No.: PCT/US2018/063593
§ 371 (c)(1),
(2) Date: Oct. 29, 2019

(87) PCT Pub. No.: WO2020/117188
PCT Pub. Date: Jun. 11, 2020

(65) Prior Publication Data
US 2021/0062066 A1    Mar. 4, 2021

(51) Int. Cl.
*C09K 8/46*    (2006.01)
*C04B 7/02*    (2006.01)
(Continued)

(52) U.S. Cl.
CPC ............ *C09K 8/46* (2013.01); *C04B 7/02* (2013.01); *C04B 20/008* (2013.01); *C04B 28/24* (2013.01)

(58) Field of Classification Search
CPC .............. C09K 8/46; C04B 7/02; C09B 7/02
(Continued)

(56) References Cited

U.S. PATENT DOCUMENTS 8,226,763 B2 * 7/2012 Beuchle .............. C04B 28/18
106/713
8,226,764 B2    7/2012 Beuchle et al.
(Continued)

FOREIGN PATENT DOCUMENTS

WO    2018157239    9/2018

OTHER PUBLICATIONS

J. Am. Ceram. Soc., 97 (7) 2298-2307 (2014), Preparation of a novel cementitious material from hydrothermally systhesized C—S—H Phases.
(Continued)

*Primary Examiner* — William D Hutton, Jr.
*Assistant Examiner* — Ashish K Varma
(74) *Attorney, Agent, or Firm* — Thomas Rooney; C. Tumey Law Group PLLC

(57) ABSTRACT

Disclosed herein are methods and compositions for cementing. An example method may comprise providing a cement composition. The cement composition may comprise a composite cementitious material comprising a micronized particulate solid and a monophase amorphous hydraulic binder. The micronized particulate solid may have a mean particle size of about 500 microns or less. The cement composition may further comprise water. The method may further comprise introducing the cement composition into a subterranean formation; and allowing the cement composition to set.

20 Claims, 4 Drawing Sheets

(51) Int. Cl.
*C04B 20/00* (2006.01)
*C04B 28/24* (2006.01)

(58) Field of Classification Search
USPC ......................................... 166/293
See application file for complete search history.

(56) References Cited

U.S. PATENT DOCUMENTS

| | | | |
|---|---|---|---|
| 8,382,892 B2 | 2/2013 | Beuchle et al. | |
| 2010/0010108 A1* | 1/2010 | Lecolier | C09K 8/473 |
| | | | 521/83 |
| 2010/0095871 A1 | 4/2010 | Patil et al. | |
| 2011/0041737 A1* | 2/2011 | Beuchle | C04B 7/3453 |
| | | | 106/739 |
| 2016/0084037 A1* | 3/2016 | Brothers | E21B 33/14 |
| | | | 166/292 |
| 2017/0349485 A1* | 12/2017 | Horta | C04B 7/47 |

OTHER PUBLICATIONS

Stemmermann P, et al., Celitement GmbH, A New Sustanable Hydraulic Binder Based on Calcium Hydrosilicates, 2010.
ISRWO International Search Report and Written Opinion for PCT/US2018/063593 dated Aug. 28, 2019.
Extended European Search Report for Application No. 18942541.6 dated Mar. 3, 2022.

\* cited by examiner

COMPOSITE CEMENTITIOUS MATERIAL FOR CEMENT COMPOSITIONS

BACKGROUND

In well cementing, such as well construction and remedial cementing, cement compositions are commonly utilized. Cement compositions may be used in a variety of subterranean applications. For example, in subterranean well construction, a pipe string (e.g., casing, liners, expandable tubulars, etc.) may be run into a well bore and cemented in place. The process of cementing the pipe string in place is commonly referred to as "primary cementing." In a typical primary cementing method, a cement composition may be pumped into an annulus between the walls of the well bore and the exterior surface of the pipe string disposed therein. The cement composition may set in the annular space, thereby forming an annular sheath of hardened, substantially impermeable cement (i.e., a cement sheath) that may support and position the pipe string in the well bore and may bond the exterior surface of the pipe string to the subterranean formation. Among other things, the cement sheath surrounding the pipe string functions to prevent the migration of fluids in the annulus, as well as protecting the pipe string from corrosion. Cement compositions also may be used in remedial cementing methods, for example, to seal cracks or holes in pipe strings or cement sheaths, to seal highly permeable formation zones or fractures, to place a cement plug, and the like.

BRIEF DESCRIPTION OF THE DRAWINGS

These drawings illustrate certain aspects of some of the embodiments of the present disclosure, and should not be used to limit or define the invention.

DETAILED DESCRIPTION

Figure 1:
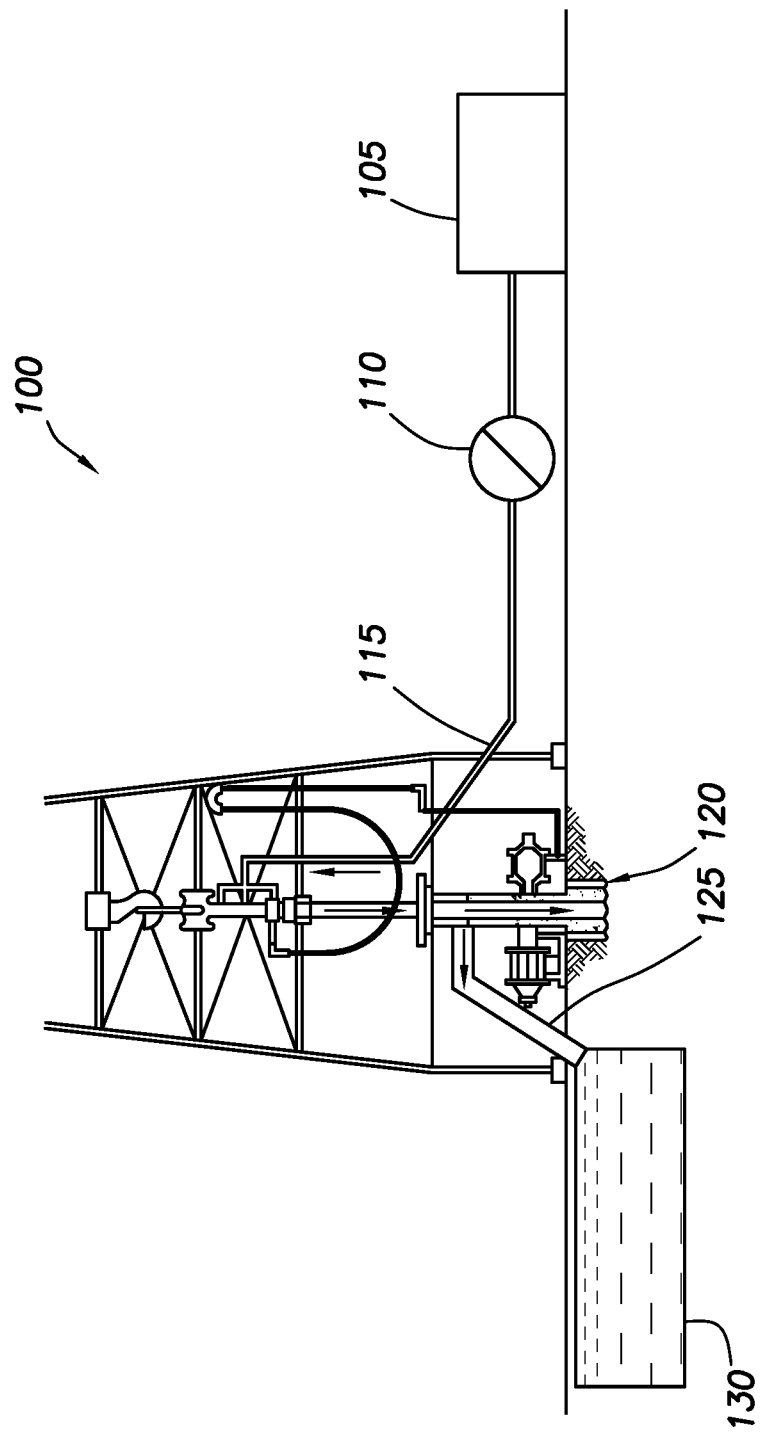
FIG. 1 is a schematic illustration showing introduction of a cement composition into a wellbore.

The present disclosure may generally relate to cementing methods and compositions. Embodiments provide a composite cementitious component for use in cementing compositions. By way of example, the composite cementitious material may include a micronized particulate solid and a monophase amorphous hydraulic binder. While the composite material may be suitable for use in any of a variety of different applications, the composite cementitious material may be particularly suitable for use as a cement extender in in low density cement compositions. As used herein, the term "low density" refers to a cement composition have a density of about 15 pounds per gallon ("lb/gal") (about 1,800 kg/m$^3$) or less. Advantageously, the composition cementitious material may provide both compressive strength and slurry stability by functioning as both a cementitious material and a cement extender.

In general, cement composition should have slurry weights in excess of 15 lb/gal, when prepared from API Class A, C, G, or H cements using the amount of water recommended in API Specification 10 for Materials and Testing for Well Cements, API Specification 10, Fifth Ed., Jul. 1, 1990. When slurry weights less than this are required, cement extenders may be used. Cement extenders (or just "extenders") is term used to describe a broad classification of materials that, in oil well cementing, are used to reduce cement slurry densities and increase slurry yields. As disclosed herein, the composite cementitious material may function as a cement extender. By decreasing slurry density and increasing yield of cement slurries, the composite cementitious material may provide several benefits, such as reducing the hydrostatic pressure required to pump the slurry in weak formations, reducing the amount of cementitious materials required to gain adequate strength and pump times, and allowing the addition of more water to the slurry, without reducing slurry stability, through various mechanisms. The composite cement material by including a material, such as a micronized particulate solid, with a density lower than cement can be used to at least partially replace cement, lowering the density of the solid material in the cement composition.

The cement compositions may include a cementitious material and water. The composite cementitious material may include a micronized particulate solid and a monophase amorphous hydraulic binder. The cement compositions may have a density suitable for a particular application. The cement compositions may have any suitable density, including, but not limited to, in the range of about 6 lb/gal (about 720 kg/m$^3$) to about 15 lb/gal (about 1,800 kg/m$^3$), or about 6 lb/gal (about 720 kg/m$^3$) to about 10 lb/gal (about 1,200 kg/m$^3$), or about 10 lb/gal (about 1,200 kg/m$^3$) to about 15 lb/gal (about 1,800 kg/m$^3$). The cement compositions may be foamed or unfoamed or may include other means to reduce their densities, such as hollow microspheres, low-density elastic beads, or other density-reducing additives known in the art. Those of ordinary skill in the art, with the benefit of this disclosure, should recognize the appropriate density for a particular application.

The composite cementitious material may include a micronized particulate solid and a monophase amorphous hydraulic binder. By combining the monophase amorphous hydraulic binder and the micronized particulate solid into a single composite cementitious material, a monophase amorphous hydraulic material may be formed. The micronized particulate solid and monophase amorphous hydraulic binder may be present in the composite cementitious material in any suitable micronized-particulate-solid-to-monophase-amorphous-hydraulic-binder weight ratio, including, but not limited to, about 4:1 to about 1:4. For example, the cementitious composite material may have a micronized-particulate-solid-to-monophase-amorphous-hydraulic-binder weight ratio of about 4:1, about 3:1, about 2:1, about 1:1, about 1:2, about 1:3, or about 1:4. In some examples, the cementitious composite material may have a micronized-particulate-solid-to-monophase-amorphous-hydraulic-binder weight ratio of about 1:2 to about 1:4.

The composite cementitious material is generally particulate in form and may have any suitable particle size distribution capable of functioning as a cementitious material for a given application. In certain embodiments, the composite cementitious material may have a mean particle size of about 1 micron to about 500 microns as defined by ASTM methods. The mean particle size corresponds to d50 values as measured by particle size analyzers such as those manufactured by Malvern Instruments, Worcestershire, United Kingdom. In some embodiments, the composite cementitious material may have a mean particle size of about 1 micron to about 400 microns, about 1 microns to about 100 microns, or about 1 microns to about 10 microns. In some embodiments, the mean particle size of the composite cementitious material may be smaller than those of cementitious materials currently being used. This smaller mean particle size may lead to a higher reactivity.

The composite cementitious material may include a micronized particulate solid. As used herein, the term "micronized" refers to particulate solids that have been processed or otherwise provided with a mean particle size of about 500 microns or less. For example, micronized particulate solid may have a mean particle size of about 500 microns or less, about 1 micron to about 250 microns, about 250 microns to about 500 microns, or about 5 microns to 50 microns.

Where processed, any of a variety of suitable processing techniques may be used to provide the micronized particulate solids. Such methods may include, but are not limited to, milling, bashing, grinding, and various methods employing supercritical fluids such as the RESS process (Rapid Expansion of Supercritical Solutions), the SAS method (Supercritical Anti-Solvent) and the PGSS method (Particles from Gas Saturated Solutions).

The micronized particulate solid may include any of a variety of materials. In some embodiments, the micronized particulate solid may have hydraulic and/or pozzolanic activity. Among other things, the micronized particulate solid may be selected based on a number of factors, including, but not limited to, particle size, availability, desired chemistry (e.g., Al/Si or Ca/Al or Ca/Si ratios), desirable reactivity (e.g., from selectively reactive quartz to highly reactive materials, such as metakaolin. Examples of suitable micronized particulate solid may include, but are not limited to, crystalline silica (e.g., quartz), amorphous silica (e.g., fly ash, silica fume, fumed silica, or pozzolan), an aluminate (e.g., calcium aluminate, sodium aluminate, bauxite, aluminate rich clays or minerals), or combinations thereof. Specific examples of suitable micronized particulate solids may include, but are not limited to, pumice, fly ash, quartz, crystalline silica, slag, metakaolin, perlite, natural glasses, rice husk ash, sugar cane ash, bioashes, cement kiln dust and/or any combination thereof. In some embodiments, the micronized particulate solid may be a pozzolanic material. As used herein, the terms "pozzolan" and/or "pozzolanic" refer to siliceous or siliceous and aluminous materials that react with calcium hydroxide in the presence of water to form cementitious compounds. One of ordinary skill in the art, along with this disclosure, would be able to select a suitable micronized particulate solid for a given application and should not be limited to the presently disclosed.

The composite cementitious material may also include a monophase amorphous hydraulic binder. As used herein, the term "monophase amorphous hydraulic binder" is to be understood to refer to a solid inorganic material that is single phase, non-crystalline, and hydraulic. When mixed with water, the monophase amorphous hydraulic binder should set and develop compressive strength as a result of reactions between the water and the monophase amorphous hydraulic binder. Any suitable monophase amorphous hydraulic binder may be used including, but not limited to, alpha-dicalciumsilicate hydrate, calcium silica hydrate gel, dicalcium silicate, tricalcium silicate, tricalcium silicate hydrate, calcium aluminiate, tetracalcium alumino ferrite, and/or any combinations thereof. In some embodiments, the monophase amorphous hydraulic material may be anhydrous. One of ordinary skill in the art, along with this disclosure, would be able to select a suitable monophase amorphous hydraulic binder for a given application and should not be limited to the presently disclosed.

The composite cementitious material may be formed using any suitable technique for combining the monophase amorphous hydraulic binder and the micronized particulate solid to form a composite material. In some embodiments, the monophase amorphous hydraulic binder may be disposed on the outer surface of a micronized particulate solid thereby forming a coated particulate. The amorphous hydraulic binder may at least partially coat the micronized particulate solid. As used herein, the terms "coat," "coating," "coated" or the like are not intended to imply any particular degree of coating, but rather mean that the monophase amorphous hydraulic binder is adhered to at least some portion of the micronized particulate solid. For example, the monophase amorphous hydraulic binder may be adhered to the micronized particulate solid such that about 20%, about 50%, about 75%, about 90%, or more of the surface area of the micronized particulate solid is coated with the monophase amorphous hydraulic binder. The monophase amorphous hydraulic binder may be disposed on the outer surface of the micronized particulate solid in any suitable manner including but not limited to, electrostatic coating, spray coatings, the like, and/or any combination thereof.

One example technique for forming the composite cementitious material will now be described. The example technique may include drying the monophase amorphous hydraulic binder. After drying, the monophase amorphous hydraulic binder may be interground with the micronized particulate solid. Hydrogen bonds in the intermediate product may be destroyed with reactive fragments of the monophase amorphous hydraulic binder deposited in a heavily disordered state on surfaces (e.g., silicate surfaces) of the micronized particulate solid with partial condensation. By way of example, the new hydraulic calcium hydrosilicates form on the surface of the interground micronized particulate solid (e.g., silicates). It should be understood that this description is merely exemplary and other suitable techniques may be used to prepare the composite cementitious material.

The composite cementitious material may be provided in the cement composition in any suitable amount. Suitable amounts may include, but are not limited to, an amount of about 20% to about 80%, about 20% to about 50%, or about 50% to about 80% by weight of the cement composition. For example, the composite cementitious material may be present in an amount of about 20%, about 30%, about 40%, about 50%, about 60%, about 70%, or about 80% by weight of the cement composition. One of ordinary skill in the art, with the benefit of this disclosure, should be able to select an appropriate amount of the composite cementitious material to use for a particular application.

In some embodiments, the cement composition may include a blend of cementitious materials that includes the composite cementitious material. The blend of cementitious materials may be dry blended and then combined with the water to form the cement composition. Alternatively, the components of the dry blend may be individually combined with the water to form the cement composition. The composite cementitious material may be present in the blend in any suitable amount, including, but not limited to, an amount of about 5% to about 100% by weight of the blend ("bwob"), or from about 10% to about 95% bwob, or from about 20% to about 50% bwob, or from about 20% to about 30% bwob. For example, the composite cementitious material may be present in an amount of about 5%, about 10%, about 20%, about 30%, about 40%, about 50%, about 60%, about 70%, about 80%, or about 90% bwob.

The blend of cementitious materials may include one or more additional cementitious materials, in addition to the composite cementitious material. Suitable cementitious materials may include, but are not limited to, Portland cement, fly ash, silica fume, gypsum, calcium aluminate cement, slag, cement kiln dust, pozzolanic materials, natural glasses, volcanic ash, and combinations thereof. In certain embodiments, the blend may include a Portland cement. In some embodiments, the Portland cements that are suited for use may be classified as Classes A, C, G, and H cements according to American Petroleum Institute, API Specification for Materials and Testing for Well Cements, API Specification 10, Fifth Ed., Jul. 1, 1990. In addition, in some embodiments, Portland cements suitable for use may be classified as ASTM Type I, II, or III. A variety of fly ashes may also be suitable, including fly ash classified as Class C and Class F fly ash according to American Petroleum Institute, API Specification for Materials and Testing for Well Cements, API Specification 10, Fifth Ed., Jul. 1, 1990. Class C fly ash includes both silica and lime so that, when mixed with water, it sets to form a hardened mass. Class F fly ash generally does not contain sufficient lime, so an additional source of calcium ions is required for the Class F fly ash to form a settable composition with water. In some embodiments, lime may be mixed with Class F fly ash in an amount in the range of about 0.1% to about 25% by weight of the fly ash. In some instances, the lime may be hydrated lime.

Optionally, the cement compositions may further include lime. In certain embodiments, the lime may be hydrated lime. Where present, the lime may be present in any suitable amount, including, but not limited to, an amount of about 1% to about 40% by weight of the composite cementitious material. In some embodiments, the lime may be present in the settable compositions in an amount of about 5% to about 20% bwoc.

The cement compositions may include water. The water used in the cement compositions may include, for example, freshwater, saltwater (e.g., water containing one or more salts dissolved therein), brine (e.g., saturated saltwater produced from subterranean formations), seawater, or combinations thereof. Generally, the water may be from any source, provided that it does not contain an excess of compounds that may undesirably affect other components in the cement composition. The water may be included in an amount sufficient to form a pumpable slurry. The water may be included in the cement compositions in any suitable amount, including, but not limited to, the range of about 40% to about 200% by weight of the cementitious materials ("bwoc") present in the cement composition. The cementitious materials may include, for example, the composite cementitious material and any additional cementitious components that may be included in the cement composition. In some examples, the water may be included in an amount in the range of about 40% to about 150% bwoc present in the cement composition.

In addition to the composite cementitious material and water, the cement compositions may further include one or more additional additives suitable for use in cementing operations also may be included the cement compositions. Examples of such additives may include, but are not limited to: weighting agents, retarders, activators, gas control additives, lightweight additives, gas-generating additives, mechanical-property-enhancing additives, lost-circulation materials, filtration-control additives, fluid-loss-control additives, defoaming agents, foaming agents, dispersants, thixotropic additives, suspending agents, and combinations thereof. One of ordinary skill in the art, with the benefit of this disclosure, should be able to select an appropriate additive for a particular application.

Advantageously, the compressive strength of the cement composition may be higher than those of currently used materials, for example, when mixed at constant slurry densities. For example, the cement composition may have any suitable 24-hour compressive strength including, but not limited to, about 500 psi (3,450 kPa) to about 8000 psi (55,200 kPa). The 24-hour compressive strength may be determined at a temperature of about 220° F. (104° C.). Compressive strength is generally the capacity of a material or structure to withstand axially directed pushing forces. The compressive strength of the cement component may be measured at a specified time after the cement component has been mixed with water and the resultant cement composition is maintained under specified temperature and pressure conditions. For example, compressive strength can be measured at a time in the range of about 24 to about 48 hours (or longer) after the fluid is mixed and the fluid is maintained at a temperature of from 100° F. (38° C.) to about 200° F. (93° C.) and atmospheric pressure. Compressive strength can be measured by either a destructive method or non-destructive method. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods typically may employ an Ultrasonic Cement Analyzer ("UCA"), available from Fann® Instrument Company, Houston, Tex. Compressive strengths may be determined in accordance with API RP 10B-2, *Recommended Practice for Testing Well Cements*, First Edition, July 2005.

Advantageously, the presently disclosed cement composition may include a high-water requirement while maintaining desirable reactivities, for example, in lightweight cement compositions. While the water requirement for typical Portland cements may be around 35% and most fly ashes around 31%, cement compositions that include the composite cementitious material may have water requirements of about 50% to about 250% and, more particularly, from about 50% to about 80%. The cement composition may be analyzed to determine its water requirement. Water requirement is typically defined as the amount of mixing water that is required to be added to a powdered, solid material to form a slurry of a specified consistency. The consistency may vary for a particular application. The following example technique for determining water requirement holds the consistency and amount of water constant while varying the amount of the solid material. However, techniques may also be applied that vary the amount of the water, the consistency, and/or the amount of solid material in any combination. The following technique also estimates the specified consistency based on the size of the vortex at the surface of the mixture in the blender. Water requirement for a particular cement component may be determined by a process that includes a) preparing a blender (e.g., Waring® blender) with a specified amount of water (e.g., about 100 grams to about 500 grams), b) agitating the water at a specified blender rpm (e.g., 4,000 to 15,000 rpm), c) adding the powdered solid that is being investigated to the water until a specified consistency is obtained, and d) calculating the water requirement based on the ratio of water to solids required to obtain the desired consistency. A specific example for determining water requirement may include, but is not limited to: 1) preparing a blender (e.g., Waring® blender) with a specified amount of water (e.g., about 100 grams to about 500 grams or about 200 grams in one example); 2) agitating the water at a specified blender rpm (e.g., about 4,000 to about 15,000 rpm or about 12,000 rpm in one example); 3) adding a specified amount (e.g., about 1 gram to about 1,000 grams or about 400 grams in one example) of the cement component to the water; 4) observing the mixture to determine if a specified consistency is obtained, for example, the cement component can be considered thoroughly wet and mixed if the vortex formed at the surface of the mixture in the blender is about 0 inches (0 mm) to about 2 inch (50 mm) or about 0.004 inches (0.1 mm) to about 1 inch (25 mm); 5) if the desired consistency is not obtained, add more cement component until desired consistency is obtained, for example, the vortex formed in the blender is about the size of a dime; and 6) calculate the water requirement based on the ratio of water to cement component to obtain the desired consistency. In some examples, the specific consistency may be where a vortex at the surface of the mixture in the blender is the size of a dime or about 0.7 in (17.9 mm). Other suitable techniques for determining the water requirement may also be used as will be appreciated by those of ordinary skill in the art.

Suitable cement compositions may be prepared in accordance with any suitable technique. The desired quantity of water may be introduced into a mixer (e.g., a cement blender) followed by the dry blend. The dry blend may include the composite cementitious material and any additional solid additives, such as additional cementitious components. Additional liquid additives, if any, may be added to the water as desired prior to, or after, combination with the dry blend. This mixture may be agitated for a sufficient period of time to form a pumpable slurry. By way of example, pumps may be used for delivery of the cement composition into the wellbore. As will be appreciated, the cement composition and/or the dry blend may be prepared at the well site or prepared offsite and then transported to the well site. If prepared offsite, the dry blend and/or cement composition and may be transported to the well site using any suitable mode of transportation, including, but not limited to, a truck, railcar, barge, or the like. Alternatively, the cement composition and and/or dry blend may be formulated at the well site, for example, where the components of the cement composition and and/or dry blend may be delivered from a transport (e.g., a vehicle or pipeline) and then mixed prior to placement downhole. As will be appreciated by those of ordinary skill in the art, with the benefit of this disclosure, other suitable techniques for preparing the cement compositions and may be used in accordance with this disclosure.

As will be appreciated by those of ordinary skill in the art, the cement composition may be used in a variety of subterranean operations, including primary and remedial cementing. A cement composition and may be provided that includes a composite cementitious material, water, and additional optional additives as described herein. The cement composition may be introduced into a subterranean formation and allowed to set therein. As used herein, introducing the cement composition into a subterranean formation includes introduction into any portion of the subterranean formation, including, but not limited to, into a wellbore drilled into the subterranean formation, into a near wellbore region surrounding the wellbore, or into both.

In primary cementing, for example, the cement composition may be introduced into an annular space between a conduit located in a wellbore and the walls of a wellbore (and/or a larger conduit in the wellbore), wherein the wellbore penetrates the subterranean formation. The cement composition may be allowed to set in the annular space to form an annular sheath of hardened cement. The cement composition may form a barrier that prevents the migration of fluids in the wellbore. The cement composition may also, for example, support the conduit in the wellbore.

In remedial cementing, a cement composition may be used, for example, in squeeze-cementing operations or in the placement of cement plugs. By way of example, the composite composition may be placed in a wellbore to plug an opening (e.g., a void or crack) in the formation, in a gravel pack, in the conduit, in the cement sheath, and/or between the cement sheath and the conduit (e.g., a microannulus).

Methods of using the cement compositions described herein in well cementing will now be described in more detail with reference to FIGS. 1-2. FIG. 1 illustrates an example system 100 that may be used for preparation and delivery of a cement composition downhole. It should be noted that while FIG. 1 generally depicts a land-based operation, those skilled in the art should readily recognize that the principles described herein are equally applicable to subsea operations that employ floating or sea-based platforms and rigs, without departing from the scope of the disclosure. As illustrated on FIG. 1, the system 100 may include a vessel 105 and a pump 110. The pump 110 may be positioned downstream of the vessel 105 and may be fluidly coupled to a tubular 115 that is in fluid communication with the wellbore 120. The tubular 115 may be configured to circulate or otherwise deliver the cement composition to the wellbore 120. The tubular 115 may be comprised, for example, of one or more different pipes that extend into the wellbore 120. The pump 110 may be, for example, one or more high pressure or low pressure pumps, which may be depend on, for example, the viscosity and density of the cement composition. The pump 110 may draw the cement composition from the vessel 105, elevate the cement composition to an appropriate pressure, and then introduce the cement composition to the tubular 115 for delivery downhole. The vessel 105 and pump 110 may be disposed on one or more cement trucks, for example. While not illustrated, system 100 may further include a recirculating mixer, a batch mixer and/or a jet mixer, which may be used for example, in preparation and/or storage of the cement composition. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Figure 2:
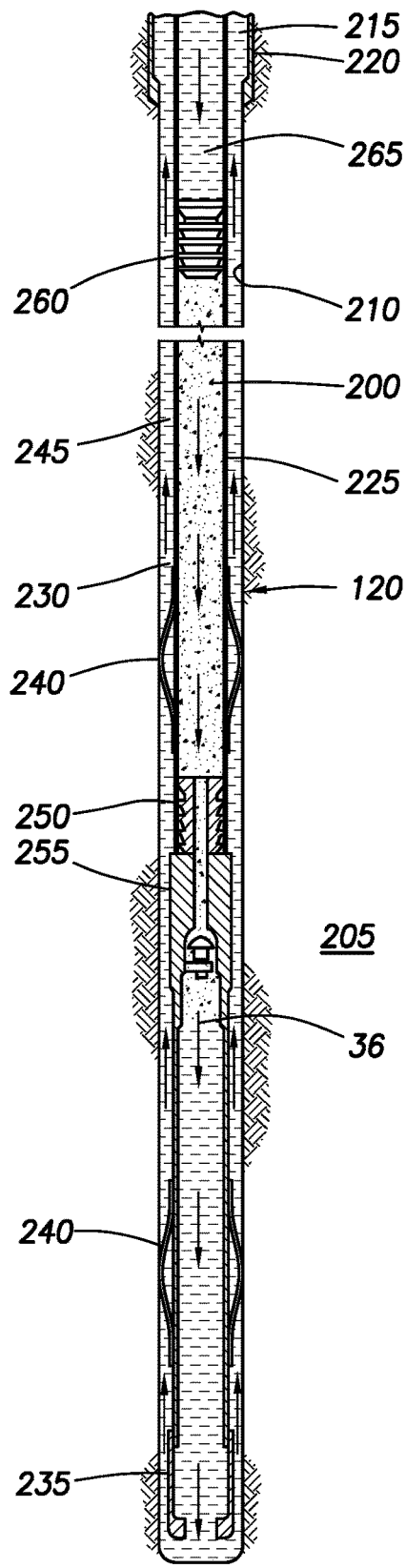
FIG. 2 is a schematic illustration showing introduction of a cement composition into a wellbore.

Turning now to FIG. 2, the cement composition 200 may be placed into a subterranean formation 205. As illustrated, wellbore 120 may be drilled into the subterranean formation 205. While wellbore 120 is shown extending generally vertically into the subterranean formation 205, the principles described herein are also applicable to wellbores that extend at an angle through the subterranean formation 205, such as horizontal and slanted wellbores. As illustrated, the wellbore 120 includes walls 210. A surface casing 215 may be cemented to the walls 210 of the wellbore 120 by cement sheath 220. One or more additional pipe strings (e.g., intermediate casing, production casing, liners, etc.), shown here as casing 225 may also be disposed in the wellbore 120. As illustrated, there is a wellbore annulus 230 formed between the casing 225 and the walls 210 of the wellbore 120 (and/or a larger conduit such as the surface casing 215). One or more centralizers 240 may be attached to the casing 225, for example, to centralize the casing 225 in the wellbore 120 prior to and during the cementing operation.

With continued reference to FIG. 2, the cement composition 200 may be pumped down the interior of the casing 225. The cement composition 200 may be allowed to flow down the interior of the casing 225 through the casing shoe 235 at the bottom of the casing 225 and up around the casing 225 into the wellbore annulus 230. The cement composition 200 may be allowed to set in the wellbore annulus 230, for example, to form a cement sheath that supports and positions the casing 225 in the wellbore 120. While not illustrated, other techniques may also be utilized for introduction of the cement composition 200. By way of example, reverse circulation techniques may be used that include introducing the cement composition 200 into the subterranean formation 205 by way of the wellbore annulus 230 instead of through the casing 225.

As it is introduced, the cement composition 200 may displace other fluids 245, such as drilling fluids and/or spacer fluids that may be present in the interior of the casing 225 and/or the wellbore annulus 230. At least a portion of the displaced fluids 245 may exit the wellbore annulus 230 via a flow line 125 and be deposited, for example, in one or more retention pits 130 (e.g., a mud pit), as shown on FIG. 1. Referring again to FIG. 2, a bottom plug 250 may be introduced into the wellbore 120 ahead of the cement composition 200, for example, to separate the cement composition 200 from the other fluids 245 that may be inside the casing 225 prior to cementing. After the bottom plug 250 reaches the landing collar 255, a diaphragm or other suitable device should rupture to allow the cement composition 200 through the bottom plug 250. In FIG. 2, the bottom plug 250 is shown on the landing collar 255. As illustrated, a top plug 260 may be introduced into the wellbore 120 behind the cement composition 200. The top plug 260 may separate the cement composition 200 from a displacement fluid 265 and also push the cement composition 200 through the bottom plug 250.

The exemplary cement compositions disclosed herein may directly or indirectly affect one or more components or pieces of equipment associated with the preparation, delivery, recapture, recycling, reuse, and/or disposal of the disclosed cement compositions. For example, the disclosed cement compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary cement compositions. The disclosed cement compositions may also directly or indirectly affect any transport or delivery equipment used to convey the cement compositions to a well site or downhole such as, for example, any transport vessels, conduits, pipelines, trucks, tubulars, and/or pipes used to compositionally move the cement compositions from one location to another, any pumps, compressors, or motors (e.g., topside or downhole) used to drive the cement compositions into motion, any valves or related joints used to regulate the pressure or flow rate of the cement compositions, and any sensors (i.e., pressure and temperature), gauges, and/or combinations thereof, and the like. The disclosed cement compositions may also directly or indirectly affect the various downhole equipment and tools that may come into contact with the cement compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Figure 3:
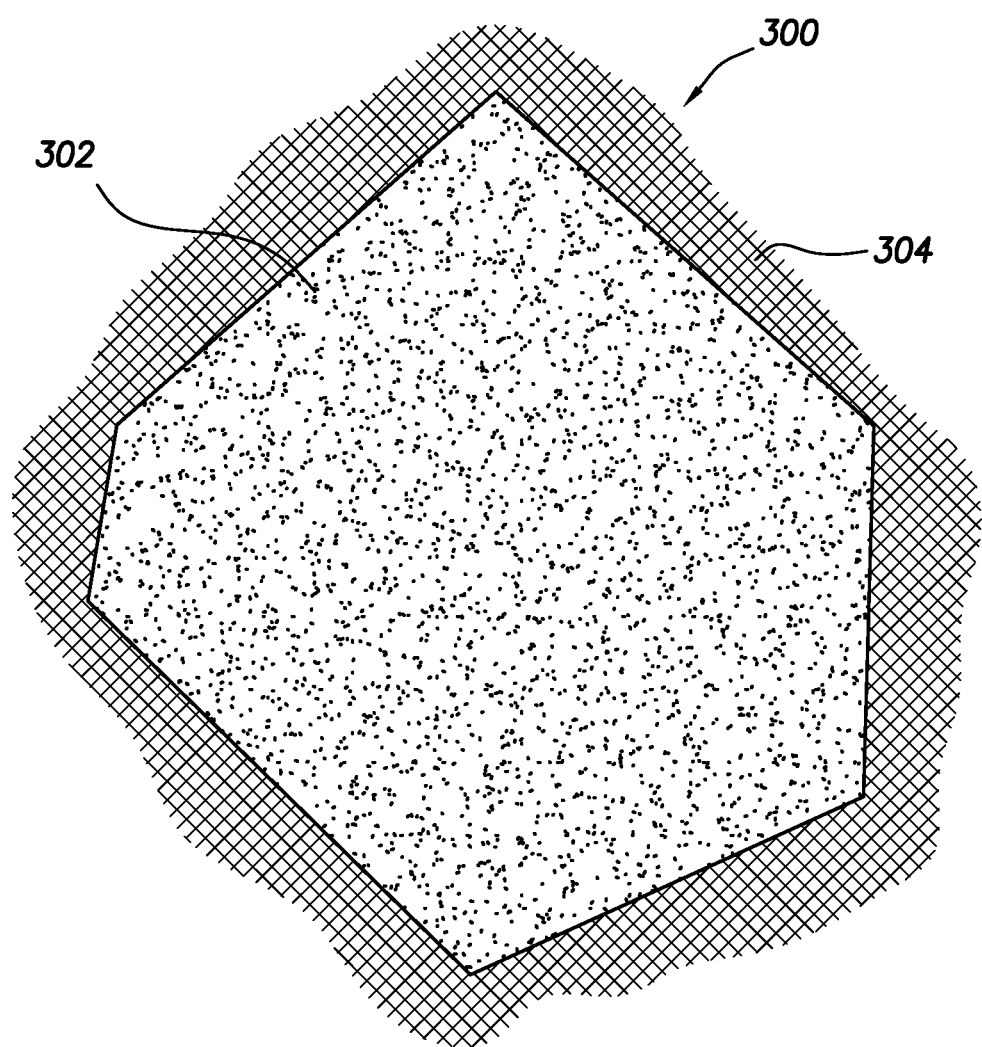
FIG. 3 is a schematic illustration of a composite cementitious material.

FIG. 3 illustrates an example of a composite cementitious component 300. As illustrated, composite cementitious component 300 may include a micronized particulate solid 302 at least partially coated with a monophase amorphous hydraulic binder 304. Monophase amorphous hydraulic binder may 304 may coat micronized particulate solid 302 in any suitable manner and should not be limited herein. It should also be noted, this is only one form in which composite cementitious component 300 may take and there may be several suitable forms in which composite cementitious component 300 may take. One of ordinary skill in the art, along with the present disclosure, may be able to select a suitable form of a composite cementitious component 300 for a given application and should not be limited to the above.

Accordingly, this disclosure describes compositions, and methods that may use a composite cementitious component for use in cementing compositions. The compositions and methods may include any of the following statements:

Statement 1. A method of cementing comprising: providing a cement composition comprising: a composite cementitious material comprising a micronized particulate solid and a monophase amorphous hydraulic binder, wherein the micronized particulate solid has a mean particle size of about 500 microns or less; and water introducing the cement composition into a subterranean formation; and allowing the cement composition to set.

Statement 2. The method of statement 1, wherein the cement composition is allowed to set in a wellbore annulus to form a cement sheath.

Statement 3. The method of statement 1, wherein the cementing composition is allowed to set in the wellbore to form a plug.

Statement 4. The method of any preceding statement, wherein the introducing comprises pumping the cement composition downhole through a casing string.

Statement 5. The method of any preceding statement, wherein the monophase amorphous hydraulic binder is deposited on the micronized particulate solid.

Statement 6. The method of any preceding statement, wherein the micronized particulate solid comprises a pozzolanic substrate on which the monophase amorphous hydraulic binder is deposited.

Statement 7. The method of any preceding statement, wherein the monophase amorphous hydraulic binder is at least partially coated on the micronized particulate solid.

Statement 8. The method of any preceding statement, wherein the micronized particulate solid comprises at least one material selected from the group consisting of pumice, fly ash, quartz, micronized crystalline silica, slag, metakaolin, perlite, natural glasses, rice husk ash, sugar cane ash, bioashes, cement kiln dust, and any combination thereof.

Statement 9. The method of any preceding statement, wherein the monophase amorphous hydraulic binder comprises at least one material selected from the group consisting of alpha-dicalciumsilicate hydrate, calcium silica hydrate gel, tricalciumsilicate hydrate, and any combination thereof.

Statement 10. The method of any preceding statement, wherein the composite cementitious material has a mean particle size of about 1 micron to about 500 microns.

Statement 11. The method of any preceding statement, wherein the composite cementitious material has a weight ratio of the monophase amorphous hydraulic binder to the micronized particulate solid of about 4:1 to about 1:4.

Statement 12. The method of any preceding statement, wherein the composite cementitious material is present in the cement composition in an amount of about 20% to about 80% by weight of the cement composition.

Statement 13. The method of any preceding statement, wherein the cement composition comprises a blend of cementitious components comprising the composite cement material and at least one additional cementitious component.

Statement 14. The method of claim 1, The method of claim 1, wherein the introducing comprises pumping the cement composition downhole through a casing string such that the cement composition sets in a wellbore annulus, wherein the cement composition comprises a blend of cementitious components comprising the composite cement material, fly ash, and Portland cement, wherein the composite cementitious material is present in the cement composition in an amount of about 20% to about 80% by weight of the cement composition, wherein the monophase amorphous hydraulic binder is deposited on the micronized particulate solid, wherein the composite cementitious material has a weight ratio of the monophase amorphous hydraulic binder to the micronized particulate solid about 4:1 to about 1:1, wherein composite cementitious material has a mean particle size of about 1 micron to about 100 microns, and wherein the micronized particulate solid comprises a pozzolanic substrate on which the monophase amorphous hydraulic binder is deposited.

Statement 15. A cement composition comprising: a composite cementitious material comprising a micronized particulate solid and a monophase amorphous hydraulic binder, wherein the micronized particulate solid has a mean particle size of about 500 microns or less; and water.

Statement 16. The cement composition of statement 15, wherein the monophase amorphous hydraulic binder is deposited on the micronized particulate solid.

Statement 17. The cement composition of statement 15 or 16, wherein the micronized particulate solid comprises a pozzolanic substrate on which the monophase amorphous hydraulic binder is deposited.

Statement 18. The cement composition of any one of claims 15 to 17, wherein the micronized particulate solid comprises at least one material selected from the group consisting of pumice, fly ash, quartz, micronized crystalline silica, slag, metakaolin, perlite, natural glasses, rice husk ash, sugar cane ash, bioashes, cement kiln dust, and any combination thereof, and wherein the monophase amorphous hydraulic binder comprises at least one material selected from the group consisting of alpha-dicalciumsilicate hydrate, calcium silica hydrate gel, tricalciumsilicate hydrate, and any combination thereof.

Statement 19. The cement composition of any one of claims 15 to 18, wherein the composite cementitious material has a mean particle size of about 1 micron to about 500 microns.

Statement 20. The cement composition of any one of claims 15 to 19, wherein the composite cementitious material is present in the cement composition in an amount of about 20% to about 80% by weight of the cement composition.

To facilitate a better understanding of the embodiments, the following examples of certain aspects of some embodiments are given. In no way should the following examples be read to limit, or define, the entire scope of the disclosure.

Example 1

A sample cement composition was made and its compressive strength was tested according to API RP 10B-2, *Recommended Practice for Testing Well Cements*, First Edition, July 2005. The sample cement composition had a density of about 13.7 lb/gal (1,780 kg/m$^3$) and had a composition according to Table 1.

TABLE 1

| Sample Cement Composition | Weight (g) |
|---|---|
| Water | 292.5 |
| Composite Cementitious Material | 450 |
| Cement Retarder | 0.7 |

The sample composition according to Table 1 was prepared according to API standards. In this example, the composite cementitious material included a monophase amorphous hydraulic material (α-C2S) deposited on a pozzolanic substrate (quartz). The cement retarder was a non-lignin retarder available as HR™-800 cement retarder.

Figure 4:
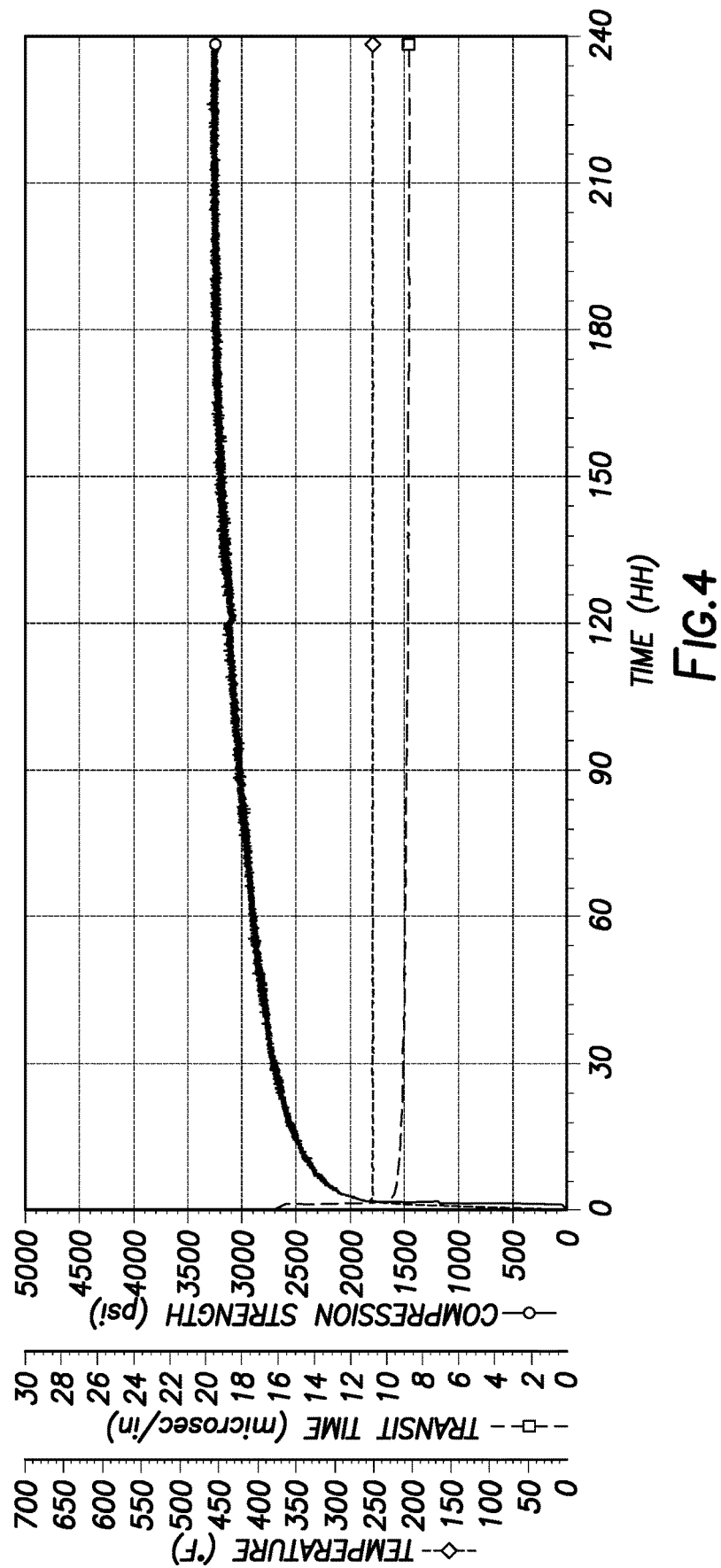
FIG. 4 is a chart showing the compressive strength of a composite cementitious material.

After preparation, the sample cement composition was then cured in an Ultrasonic Cement Analyzer ("UCA"), available from Fann® Instrument Company, at a temperature of about 250° F. (120° C.) for about 10 days. The sample cement composition had a 1-hour compressive strength of about 50 psi (340 kPa). The sample cement composition had a 24-hour compressive strength of about 2,644 psi (18,230 kPa), and a 10-day compressive strength of about 3,232 psi (22,280 kPa). These results are also shown in FIG. 4.

Example 2

The compressive strength of the composite cementitious material was tested against other cementitious materials. In this example, the composite cementitious material included a monophase amorphous hydraulic material (α-C2S) deposited on a pozzolanic substrate (quartz). The dry blend used in each sample cement composition is listed in the table below.

TABLE 2

| Dry Blend | Composite Cementitious Material (BWOB) | Type I/II Portland Cement (BWOB) | Portland Cement Class G (BWOB) | Fly Ash Type F (BWOB) | Compacted Silica Fume (BWOB) |
|---|---|---|---|---|---|
| A | 25.2% | 31.3% | 43.5% | 43.5% | — |
| B | — | 74.8% | — | 25.2% | — |
| C | — | 31.3% | 25.2% | 43.5% | — |
| D | — | 31.3% | — | 43.5% | 25.2% |

After each dry blend was prepared, they were then mixed with water in a blender and mixed according to API specifications thereby forming four different sample cement compositions with a density of 13.2 lb/gal (1,580 kg/m³). It should be noted that all of the sample cement compositions in were formulated to have a density of about 13.2 lb/gal (1,580 kg/m³) by varying the water content. These sample cement compositions were then cured for 3 days at a temperature of about 220° F. (104° C.) at about 3,000 psi (20,680 kPa). They were then crushed and their compressive strengths were determined according to API RP 10B-2, *Recommended Practice for Testing Well Cements*, First Edition, July 2005. These results are shown in Table 3.

TABLE 3

| Dry Blend | Compressive strength (psi) |
|---|---|
| A | 2555 (17,615 kPa) |
| B | 1416 (9,760 kPa) |
| C | 1614 (11,130 kPa) |
| D | 1506 (10,380 kPa) |

The results shown in Table 3 show that the dry blends including the composite cementitious material result in a substantially higher compressive strength than other cementitious materials.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular examples disclosed above are illustrative only, as the present disclosure may be modified and practiced in different but equivalent manners apparent to those skilled in the art having the benefit of the teachings herein. Although individual examples are discussed, the methods and compositions of the present disclosure covers all combinations of all those examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method of cementing comprising:
introducing a cement composition into a subterranean formation, the cement composition comprising:
a composite cementitious material comprising a micronized particulate solid coated with a monophase amorphous hydraulic binder, wherein the micronized particulate solid has a mean particle size of about 500 microns or less, wherein the micronized particulate solid has hydraulic and/or pozzolanic activity, wherein the monophase amorphous hydraulic binder is deposited on the micronized particulate solid, and wherein 20% or more of the surface area of the micronized particulate solid is coated with the monophase amorphous hydraulic binder; and
water; and
allowing the cement composition to set.

2. The method of claim 1, wherein the cement composition is allowed to set in a wellbore annulus to form a cement sheath.

3. The method of claim 1, wherein the cementing composition is allowed to set in the wellbore to form a plug.

4. The method of claim 1, wherein the introducing comprises pumping the cement composition downhole through a casing string.

5. The method of claim 1, wherein the micronized particulate solid comprises a pozzolanic substrate on which the monophase amorphous hydraulic binder is deposited.

6. The method of claim 1, wherein the monophase amorphous hydraulic binder is coated on at least 20% of the surface area of the micronized particulate solid.

7. The method of claim 1, wherein the micronized particulate solid comprises at least one material selected from the group consisting of pumice, fly ash, quartz, micronized crystalline silica, slag, metakaolin, perlite, natural glasses, rice husk ash, sugar cane ash, bioashes, cement kiln dust, and any combination thereof.

8. The method of claim 1, wherein the monophase amorphous hydraulic binder comprises at least one material selected from the group consisting of alpha-dicalciumsilicate hydrate, calcium silica hydrate gel, tricalciumsilicate hydrate, and any combination thereof.

9. The method of claim 1, wherein the composite cementitious material has a mean particle size of about 1 micron to about 500 microns.

10. The method of claim 1, wherein the composite cementitious material has a weight ratio of the monophase amorphous hydraulic binder to the micronized particulate solid of about 4:1 to about 1:4.

11. The method of claim 1, wherein the composite cementitious material is present in the cement composition in an amount of about 20% to about 80% by weight of the cement composition.

12. The method of claim 1, wherein the cement composition comprises a blend of cementitious components comprising the composite cement material and at least one additional cementitious component.

13. The method of claim 1, wherein the introducing comprises pumping the cement composition downhole through a casing string such that the cement composition sets in a wellbore annulus, wherein the cement composition comprises a blend of cementitious components comprising the composite cement material, fly ash, and Portland cement, wherein the composite cementitious material is present in the cement composition in an amount of about 20% to about 80% by weight of the cement composition, wherein the monophase amorphous hydraulic binder is deposited on the micronized particulate solid, wherein the composite cementitious material has a weight ratio of the monophase amorphous hydraulic binder to the micronized particulate solid about 4:1 to about 1:1, wherein composite cementitious material has a mean particle size of about 1 micron to about 100 microns, and wherein the micronized particulate solid comprises a pozzolanic substrate on which the monophase amorphous hydraulic binder is deposited.

14. The method of claim 1, wherein at least a portion of the monophase amorphous hydraulic binder coating comprises silicate surfaces deposited on one or more surfaces of the micronized particulate solid, wherein formation of the silicate surfaces involves partial condensation.

15. The method of claim 14, wherein the formation of the silicate surfaces on the micronized particulate solid further involves destroying one or more hydrogen bonds of an intermediate product of interground micronized particulate solid and monophase amorphous hydraulic binder.

16. A cement composition comprising:
a composite cementitious material comprising a micronized particulate solid coated with a monophase amorphous hydraulic binder, wherein the micronized particulate solid has a mean particle size of about 500 microns or less, wherein the micronized particulate solid has hydraulic and/or pozzolanic activity, wherein the monophase amorphous hydraulic binder is deposited on the micronized particulate solid, and wherein 20% or more of the surface area of the micronized particulate solid is coated with the monophase amorphous hydraulic binder; and
water.

17. The cement composition of claim 16, wherein the micronized particulate solid comprises a pozzolanic substrate on which the monophase amorphous hydraulic binder is deposited.

18. The cement composition of claim 16, wherein the micronized particulate solid comprises at least one material selected from the group consisting of pumice, fly ash, quartz, micronized crystalline silica, slag, metakaolin, perlite, natural glasses, rice husk ash, sugar cane ash, bioashes, cement kiln dust, and any combination thereof, and wherein the monophase amorphous hydraulic binder comprises at least one material selected from the group consisting of alpha-dicalciumsilicate hydrate, calcium silica hydrate gel, tricalciumsilicate hydrate, and any combination thereof.

19. The cement composition of claim 16, wherein the composite cementitious material has a mean particle size of about 1 micron to about 500 microns.

20. The cement composition of claim 16, wherein the composite cementitious material is present in the cement composition in an amount of about 20% to about 80% by weight of the cement composition.

* * * * *